Dec. 23, 1969  L. C. GOODRIDGE  3,485,936
COMPACT THERMAL EXPANSION ABSORBING UNIT FOR
ELECTRIC POWER BUSWAYS

Filed July 1, 1968  4 Sheets-Sheet 1

INVENTOR.
LAWRENCE C. GOODRIDGE
BY Robert P. Casey
ATTORNEY

INVENTOR.
LAWRENCE C. GOODRIDGE
BY Robert P. Casey
ATTORNEY

Dec. 23, 1969   L. C. GOODRIDGE   3,485,936
COMPACT THERMAL EXPANSION ABSORBING UNIT FOR
ELECTRIC POWER BUSWAYS
Filed July 1, 1968   4 Sheets-Sheet 4

INVENTOR.
LAWRENCE C. GOODRIDGE
BY Robert P. Casey
ATTORNEY

United States Patent Office 3,485,936
Patented Dec. 23, 1969

3,485,936
COMPACT THERMAL EXPANSION ABSORBING UNIT FOR ELECTRIC POWER BUSWAYS
Lawrence C. Goodridge, Bristol, Conn., assignor to General Electric Company, a corporation of New York
Filed July 1, 1968, Ser. No. 741,644
Int. Cl. H02g 15/08
U.S. Cl. 174—88                                6 Claims

ABSTRACT OF THE DISCLOSURE

A compact thermal expansion absorbing unit for electric power busways including a plurality of flexible conductor links each comprising a group of thin strips of flexible conductor material, the flexible conductor links being bolted at either end to the ends of corresponding busbar conductors, the flexible conductor links extending substantially perpendicular to the plane of the busbar conductors.

BACKGROUND OF THE INVENTION

Field of the invention

My invention relates to electrical power distribution systems of the type commonly referred to as "busways," and more particularly to thermal expansion units or sections employed in such busways for the purpose of absorbing the expansion and contraction of the busway housing and the busbars enclosed therein resulting from temperature changes.

Description of the prior art

The trend in city development has been to "high-rise" buildings which provide more applications for "risers" runs of busway, extending vertically throughout a building from the basement to the top floor thereof and utilized to provide an electrical power carrier from which power may be tapped at each floor level to supply electrical power requirements of that particular floor.

As these riser runs of busway become longer and longer, it becomes necessary to provide some means in the busway system to allow for the expansion and contraction of the busway housing and the busbars enclosed therein caused by changes in temperature resulting from the heat generated within the busway housing by the electrical current passing through the busbars when the busway is carrying current. Generally, it has been found that in short runs of riser busway the aforesaid expansion and contraction can be accommodated within the busway system itself without any need for special absorbing means. Because of the cumulative action, however, a small amount of expansion or contraction per section of busway poses a serious problem in long runs of busway unless some means is provided therein to absorb it.

For example, the forces created as a result of thermal expansion have been strong enough in installations wherein both ends of the busway are fixed to cause the individual busbars to bow outwardly, resulting in failures. Further, with vertically mounted or riser busway systems wherein the busway housing is supported at each floor that it passes through, the forces of thermal expansion tend to cause unequal weight distribution of the busway among the various support points.

In an effort to solve this problem, it has become common practice in accordance with the prior art to provide "thermal expansion" devices or units in the busway system at predetermined intervals for the purpose of providing a means of absorbing for the aforesaid expansion and contraction. Because space in these high-rise buildings is so costly, however, the electrical closets, or enclosures in which riser runs of busway are usually installed are often so small that there is insufficient space for prior art types of thermal expansion devices. A need has therefore been created for a busway thermal expansion device of minimum size to accommodate these conditions.

OBJECTS OF THE INVENTION

It is an object of the present invention to provide an improved thermal expansion device for busways which is of minimum size. More specifically, it is an object of the present invention to provide an improved thermal expansion device which has a width no greater than that of the other portions of the busway run, a depth only slightly larger, and a length which represents approximately a 50% reduction over that of prior art forms of busway thermal expansion devices.

Another object of the present invention is to provide such an improved thermal expansion device which may be installed in a run of "riser" busway without requiring for its installation any modifications in the busway system.

A still further object of the present invention is to provide such an improved busway thermal expansion device which is relatively simple in construction, relatively inexpensive to manufacture, and comparatively easy to install.

SUMMARY OF THE INVENTION

In accordance with the present invention there is provided a busway thermal expansion device including a generally rectangular housing having a top wall, a back wall, and a plurality of side walls. Supported within the housing are two sets of relatively wide, thin flat busbar conductors, extending outwardly of the housing at either side thereof. A plurality of flexible conductor links, each comprising a group of thin strips of flexible conductive material are bolted to the ends of corresponding bars of the two sets of busbar conductors. The plurality of flexible conductor links extend generally perpendicular to the general plane of the wide sides of the busbar conductors. The conductor links can therefore flex easily as the busbar conductors expand and contract as a result of temperature changes.

The invention will be more fully understood from the following detailed description, and its scope will be pointed out in the appended claims.

DESCRIPTION OF A PREFERRED EMBODIMENT

Figure 1:
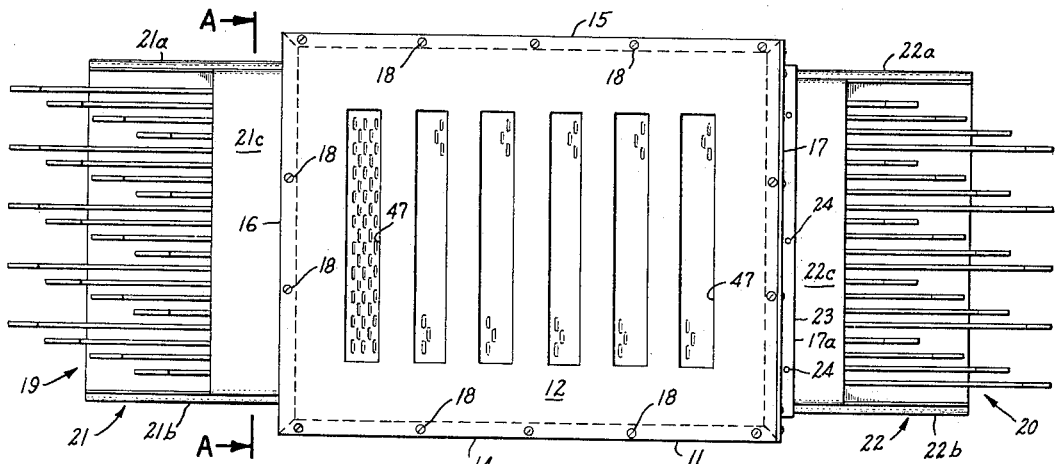
FIGURE 1 is a top plan view of a thermal expansion device for busways in accordance with the present invention.
Figure 2:
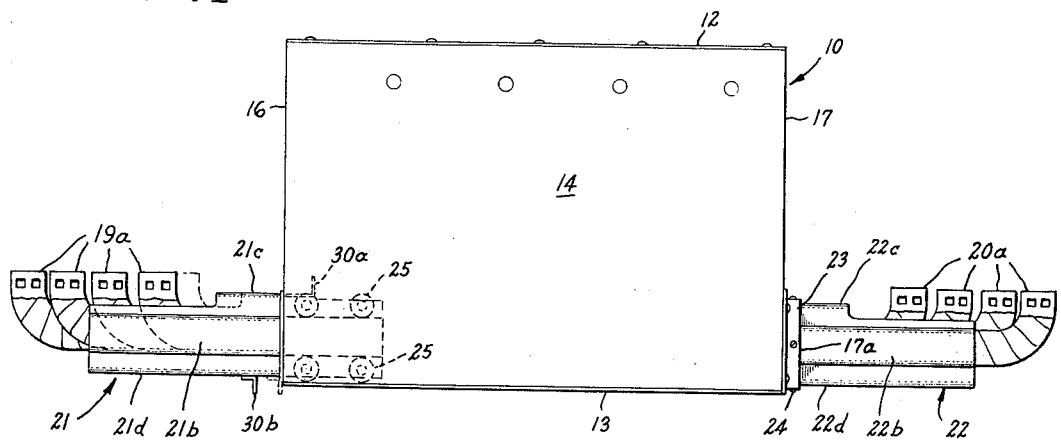
FIGURE 2 is a side elevation view of a thermal expansion device for busways in accordance with the present invention.
Figure 3:
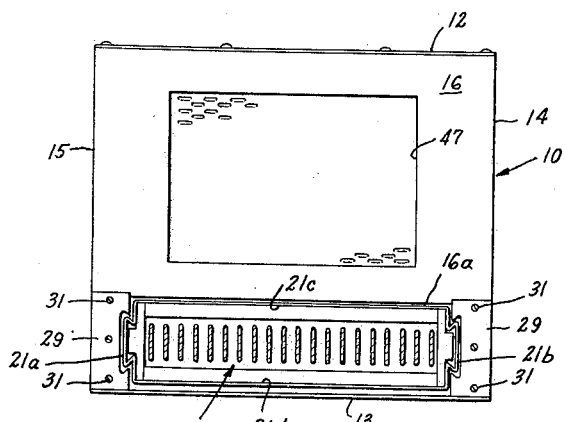
FIGURE 3 is a sectional view of the thermal expansion device of FIGURE 1 taken substantially on the line A—A of FIGURE 1.

Referring to FIGURES 1, 2, and 3 of the drawings, the invention is shown as incorporated in a thermal expansion device 10 intended for use in busway systems. The expansion device 10 includes a housing 11 having top and bottom walls 12 and 13, respectively, side walls 14 and 15, and end walls 16 and 17, joined together by suitable means such as screws 18 through overlapping edge portions thereof.

The housing 11 contains a plurality of elongated generally parallel busbar conductors including a first group of busbar conductors 19 supported in one portion of the housing 11, and a second group of busbar conductors 20 supported in a second portion of the housing 11. All of the aforesaid busbar conductors 19 and 20 are supported in side-by-side generally parallel relation in a row transversely of said housing 11 by suitable insulating and spacing supports (not shown) in any suitable manner. Each of the busbar conductors 19 and 20 has one of its outer ends bent edgewise generally at right angles to the main portion thereof for the purpose of facilitating connection thereto of busbar conductors of an adjacent busway section (not shown).

The end portions 19a and 20a, respectively, of the busbar conductors 19 and 20, extend outwardly of the thermal expansion device housing 11 through suitable openings 16a and 17a provided therefor in the end walls 16 and 17, respectively, and are substantially enclosed by busbar housings 21 and 22, respectively. Each of the busbar housings 21 and 22 includes side walls 21a, 21b, and 22a, 22b respectively, and top and bototm walls 21c, 21d, and 22c, 22d, respectively, joined together by suitable means such as by screws (not shown) through overlapping edge portions thereof. The busbar housing 22 is fixedly secured in juxtaposed relation to the opening 17a provided in end wall 17 of the housing 11 by means of a clamping member 23 which is attached to the busbar housing 22 and end wall 17 by suitable means such as by a plurality of screws 24.

Figure 5:
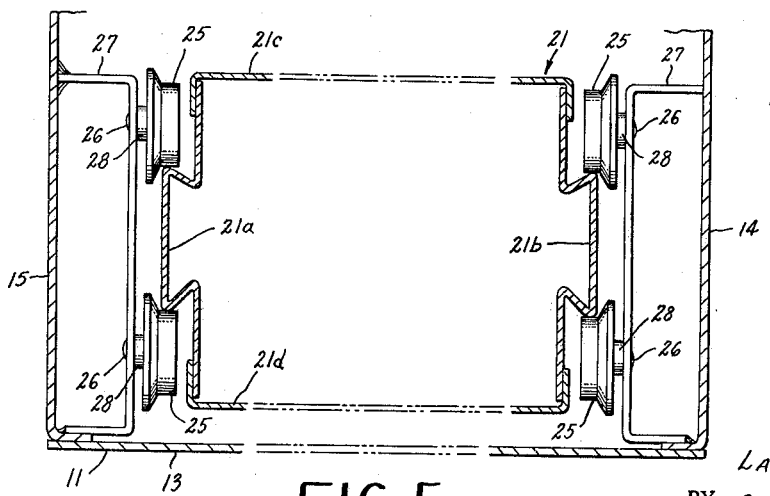
FIGURE 5 is a partial sectional end view of the housing portion of the thermal expansion device in accordance with the present invention.

Referring to FIGURES 2, 3, and 5, the busbar housing 21 is supported in the opening 16a in end wall 16 for movement relative thereto by means of a plurality of rollers 25 which are rotatably mounted on pins 26 and are spaced from the respective support member 27 by suitable means such as spacers 28. The pair of support members 27 are secured to the side walls 14 and 15 of the housing 11 closely adjacent the end wall 16 and in juxtaposed relation to the opening 16a by suitable means such as by welding, etc. As illustrated in FIGURE 5 of the drawings, a pair of rollers 25 are provided in engaging relation relative to each of the side walls 21a and 21b of the busbar housing 21. The busbar housing 21 and the busbar conductors 19 enclosed therein are thus free to move relative to the housing 11 in a manner to be more fully described hereinafter.

In accordance with the illustrated embodiment of the invention, a pair of guide members 29 and a pair of stop members 30a and 30b are also provided which cooperate with the busbar housing 21. The guide members 29, which serve to guide the busbar housing 21 in its movements relative to the housing 11 have a design configuration which complements that of the side walls 21a and 21b of busbar housing 21 and are fixedly attached to the exterior surface of the end wall 16 at either side thereof by means such as screws 31. The stop members 30a and 30b are secured to the top and bottom walls 21c and 21d, respectively, of busbar housing 21 by suitable means such as by welding, etc., such that should the stop member 30a engage the interior surface of the end wall 16 as the busbar housing 21 moves outwardly of the housing 11 further movement of the busbar housing 21 and the busbar conductors 19 enclosed therein will be prevented. Similarly, should the stop member 30b engage the exterior surface of the end wall 16 as the busbar housing 21 moves inwardly relative to the housing 11 member 30b will thus prevent further movement of the busbar housing 21 and the busbar conductors 19 enclosed therein.

Figure 6:
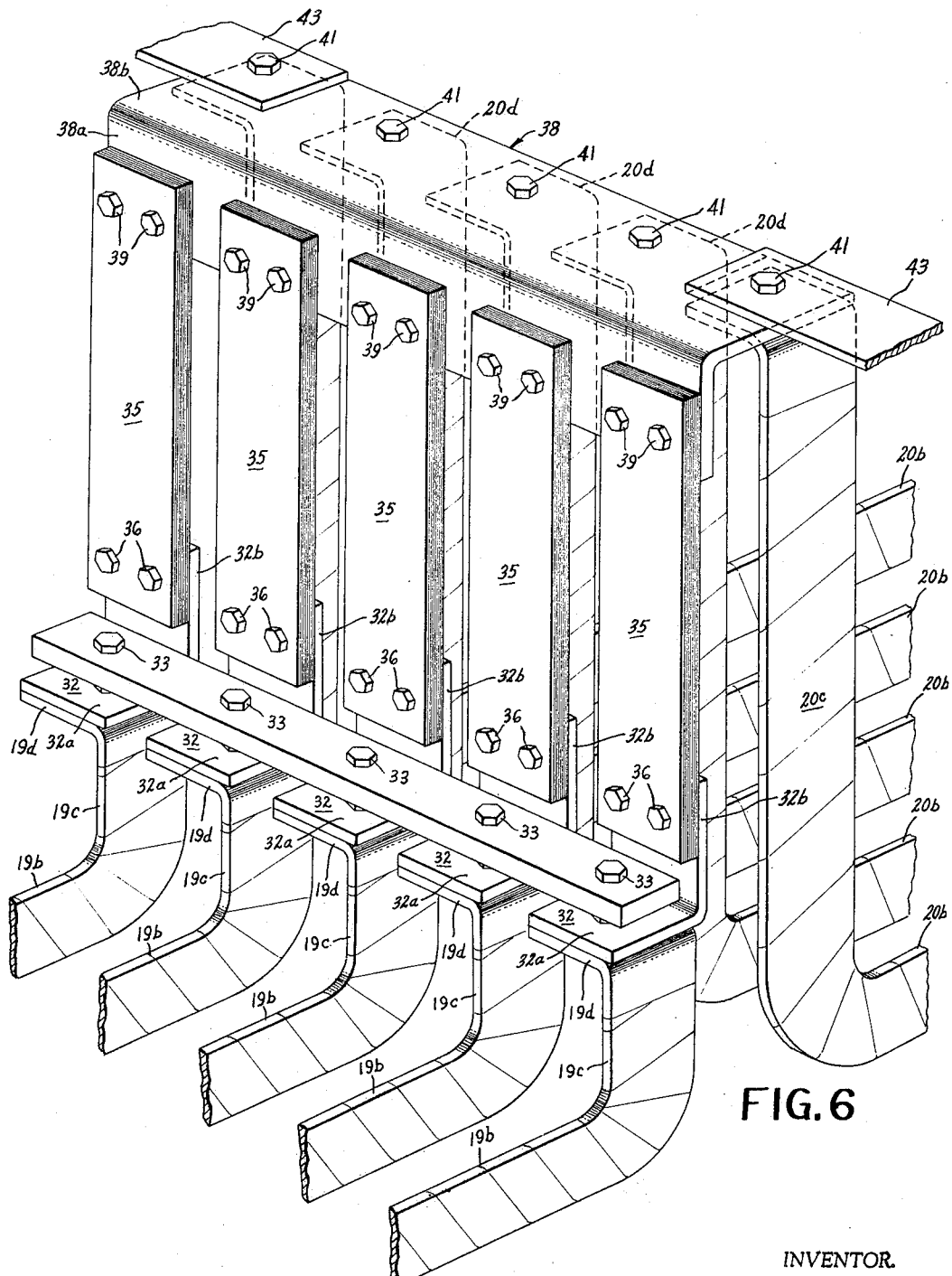
FIGURE 6 is a perspective view of a plurality of flexible conductor links interconnected with corresponding ends of the busbar conductors of the thermal expansion device in accordance with the present invention.
Figure 7:
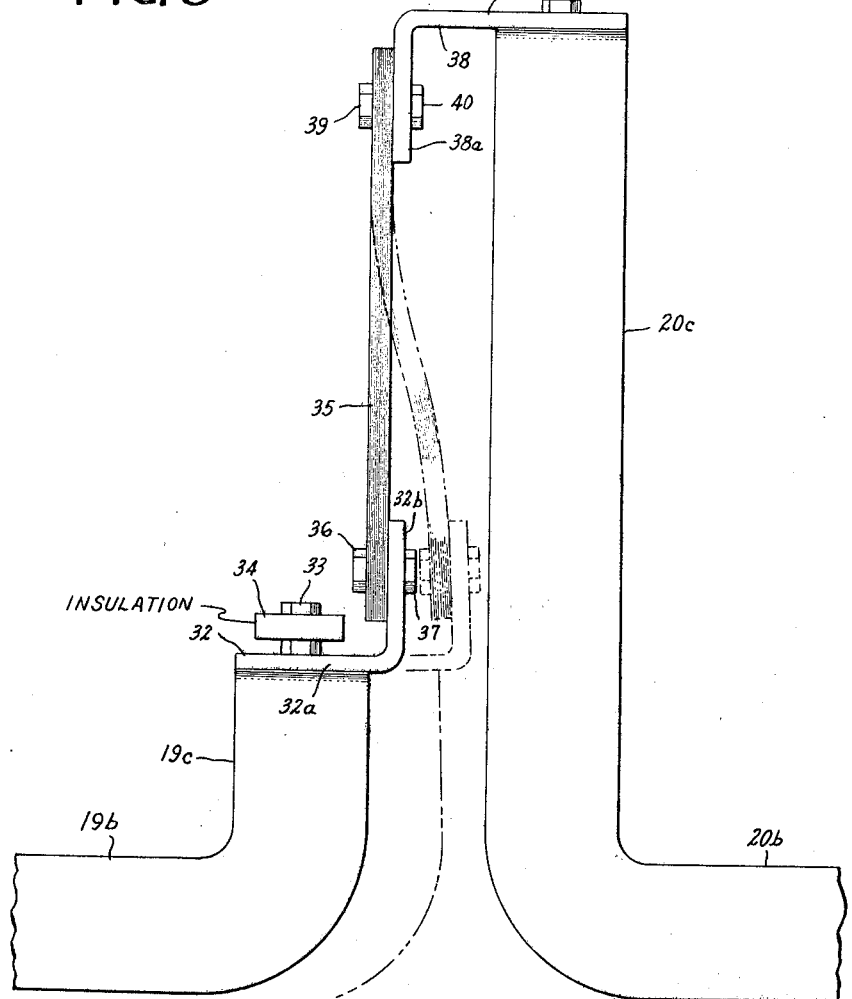
FIGURE 7 is a side elevation view of the plurality of flexible conductor links illustrated in FIGURE 6.

In accordance with the embodiment of the invention illustrated in the drawings, each of the first and second groups of busbar conductors 19 and 20, respectively, includes three separate phase groups of five busbars each and a neutral also with five busbars thereby constituting a total of twenty busbar conductotrs in each of said first and second groups of busbar conductors 19 and 20, respectively. FIGURES 6 and 7 of the drawings illustrate the manner in which one such phase grouping of busbar conductors 19 is interconnected with a corresponding number of busbar conductors 20 of the same phase. Inasmuch as each of the phases of the respective group of busbar conductors 19 and 20 are interconnected in the same manner, only one such interconnection will be described hereinafter.

Thus, with reference to FIGURES 6 and 7 of the drawings, the end portions 19b of the busbar conductors 19 illustrated therein each have a portion 19c bent upwardly at right angles to the main portion of the busbar conductors 19, and a portion 19d bent transversely to the portion 19c thereof. An L-shaped connector member 32 having relatively short legs 32a and 32b is fixedly secured to each of the busbar conductors 19 with the leg 32a of the member 32 secured to the portion 19d of busbar conductor 19 by suitable means such as by bolts 33 and nuts (not shown). Preferably, an insulating member 34 is utilized for the purpose of providing additional support to the busbar conductors 19 and the L-shaped connector members 32 relative to the housing 11, the member 34 being bolted in spaced relation to each of the busbar conductors 19 and L-shaped connector members 32 by means of the aforesaid bolts 33 and nuts (not shown). The member 34 is preferably made of an insulating material such that it serves only to mechanically interconnect the busbar conductors 19 and does not electrically interconnect them.

The other leg 32b of each of the L-shaped connector members 32 is connected to a flexible conductor link 35 by suitable means such as by a pair of bolts 36 and cooperating nuts 37. Each of the flexible conductor links 35 comprises a plurality of thin strips of suitable conductive material such as copper or aluminum. The other end of each of the flexible conductor links 35 is connected to an angle member 38 by a pair of bolts 39 and cooperation nuts 40. All of the flexible conductor links 35 are secured to the leg portion 38a of angle member 38.

As in the case of the busbar conductors 19 the end portions 20b of each of the busbar conductors 20 as illustrated in FIGURE 6 have a portion 20c bent upwardly at right angles to the main portion of the busbar conductors 20, and a portion 20d bent transversely to the portion 20c thereof. The other leg portion 38b of angle member 38 is secured to the portion 20d of each of the busbar conductors 20 by suitable means such as bolts 41 and nuts 42. It will therefore be seen that the angle member 38 serves to connect together each of the busbar conductors 20 which as illustrated in FIGURE 6 will be understood to be all of the same phase, and also interconnects each of the busbar conductors 20 through the flexible conductor links 35 and the L-shaped connector members 32 to a corresponding one of the busbar conductors 19 which also would be of the same phase as that of the busbar conductor 20 with which it is electrically interconnected. The angle member 38 is therefore capable of functioning as a phase collector to provide more nearly equal intraphase current distribution between the various busbar conductors of the same phase in the first and second groups of busbar conductors 19 and 20, respectively.

Figure 4:
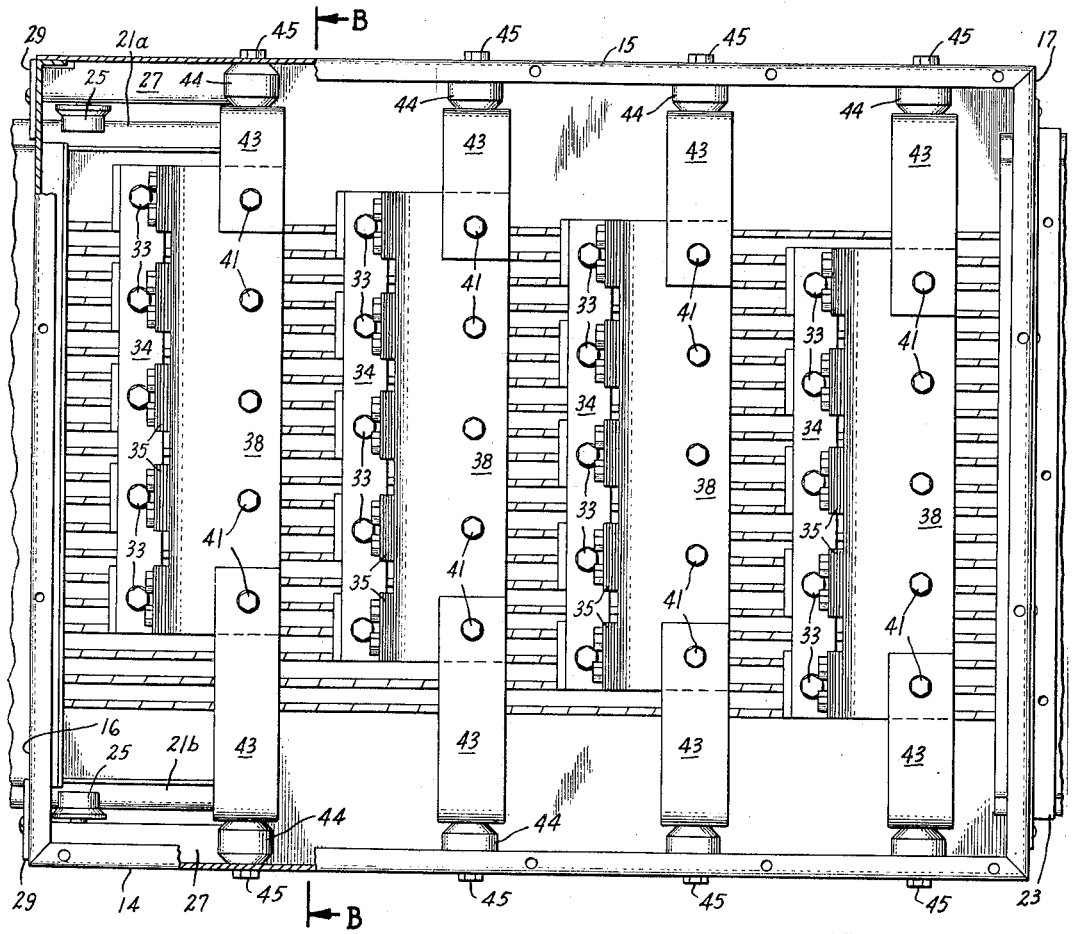
FIGURE 4 is a top plan view of the thermal evpansion device for busways in accordance with the present invention with the top cover removed and parts broken away for purposes of clarity of illustration.
Figure 8:
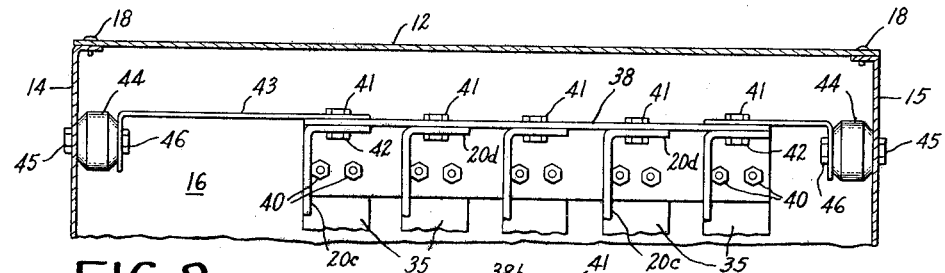
FIGURE 8 is a partial sectional view of the thermal expansion device of FIGURE 4 taken substantially on the line B—B of FIGURE 4.

It is further noted with reference to FIGURE 6 that the bolts 41 and nuts 42 which serve to secure the outermost ones of the busbar conductors 20 to the angle member 38 also serve to fasten the support members 43 to the angle member 38. As shown more particularly in FIGURE 4 of the drawings, the support members 43 serve to space as well as support the angle member 38 and the respective end portions of the busbar conductors 19 and 20 from the side walls 14 and 15 of the housing 11. The support members 43 themselves inasmuch as they preferably are formed of relatively inexpensive metallic material such as steel are insulated from the side walls 14 and 15 by suitable means such as barrel insulators 44, the latter being secured to the side walls 14 and 15 in a manner well-known in the art such as by means of bolts 45 as shown in FIGURE 8. As shown in FIGURE 4 of the drawings, the support members 43 are preferably of differing lengths such that the angle members 38 are staggered relative to each other in order to ensure the proper electrical interconnection of busbar conductors 19 and 20 which bear the same phase relationship relative to each other.

Referring now to FIGURE 7 of the drawings, the solid line position of the busbar conductors 19 illustrates the normal or installed position thereof, i.e., with the busbar conductors 19 "cold." As the busbar conductors 19 become heated by virtue primarily of heat being generated therein as electric current passes through the busbar conductors in the busway system of which the thermal expansion device 10 is a part, the busbar conductors 19 expand as illustrated in dotted lines in FIGURE 7. Because of the flexibility of the flexible conductor links 35 the busbar conductors 19 are capable of expanding relative to the busbar conductors 20 which are fixed relative to the thermal expansion device housing 11.

Although FIGURE 7 of the drawings shows only the busbar conductors 19 moving, it will be understood that as the busbar conductors 19 expand the busbar housing 21 which encloses the latter will also move relative to the housing 11 along the previously described rollers 25 which are provided for this purpose. Notwithstanding the fact that the number of thin strips of conductive material which comprises each of the flexible conductor links 35 varies as the current rating of the busbar conductor varies, the conductor links 35 by virtue of their laminated construction nevertheless remain flexible enough to permit the aforementioned movement of the busbar conductors 19 and the busbar housing 21.

As the busbar conductors 19 cool and contract, they will return to the position illustrated in solid lines in FIGURE 7 and the busbar housing 21 will return from the position illustrated in dotted lines in FIGURE 2 to that illustrated in solid lines therein. It is thus seen that there has been provided a thermal expansion device 10 which is of minimum size but which nevertheless retains the ability of accommodating the amount of expansion and contraction occurring in a given busway system.

With reference to FIGURES 1 and 3 of the drawings, the housing 11 is illustrated as having a plurality of ventilation openings 47 therein which are preferably utilized for the purpose of providing maximum ventilation and cooling within the thermal expansion device 10. Of course if desired the aforementioned ventilation openings 47 could be omitted without departing from the essence of the previously described invention.

While my invention has been illustrated as designed for use in a multi-phase busway system in which there are five bars per phase, it will be understood that the principles of construction of the thermal expansion device of the present invention are equally applicable to thermal expansion devices intended to be utilized in busway systems having more or fewer bars per phase.

While I have disclosed only one embodiment of my invention, it will be appreciated that many modifications thereof may readily be made by those skilled in the art.

What I claim as new and desire to secure by Letters Patent of the United States is:

1. A thermal expansion device for use in busbar type electrical power distribution systems comprising:
   (a) a generally rectangular housing including top and bottom walls, and at least one pair of opposed side walls;
   (b) a first group of elongated generally parallel busbar conductors;
   (c) means slidably mounting said first group of elongated generally parallel busbar conductors within said housing with one end of each of said busbar conductors extending outwardly of said housing through one of said one pair of opposed side walls;
   (d) a second group of elongated generally parallel busbar conductors;
   (e) means fixedly mounting said second group of elongated generally parallel busbar conductors within said housing with one end of each of said second group of elonagted generally parallel busbar conductors extending outwardly of said housing through the other of said one pair of opposed side walls;
   (f) each of said busbar conductors of said first and second groups comprising a relatively wide thin flat conductor having its wide side disposed in a predetermined plane, and the wide sides of all of said busbars extending generally parallel to each other;
   (g) a plurality of flexible conductors within said housing, each of said flexible conductors comprising a relatively wide thin flat conductor having its wide side extending substantially at right angles to said wide sides of said first and second groups of busbar conductors;
   (h) first means connecting one end of each of said flexible connectors to one end of a corresponding busbar conductor, second means connecting the other end of each of said flexible conductors to one end of each of said second group of said busbar conductors; and
   (i) said flexible conductor means flexing to enable said first group of elongated generally parallel busbar conductors to move relative to said housing as thermal expansion and contraction occurs in said electrical power distribution system.

2. A thermal expansion device as set forth in claim 1 wherein:
   (a) said means slidably mounting said first group of elongated generally parallel busbar conductors comprises a second busbar housing having top and bottom walls and opposed side walls substantially enclosing said one end of said first group of elongated generally parallel busbar conductors extending outwardly of said generally rectangular housing in engaging relation to said opposed side walls of said second busbar housing; and
   (b) said means fixedly mounting said second group of elongated generally parallel busbar conductors comprises a third busbar housing having top and bottom walls and opposed side walls substantially enclosing said one end of said second group of elongated generally parallel busbar conductors extending outwardly of said generally rectangular housing, and clamping means fastening said third busbar housing to said other of said one pair of side walls of said generally rectangular housing.

3. A busway thermal expansion device as set forth in claim 1 wherein:
   (a) said flexible conductor means comprises a plurality of flexible conductor links corresponding in number to the number of said first group of elongated generally parallel busbar conductors; and
   (b) each of said plurality of flexible conductor links is constructed of a plurality of relatively wide thin flat strips of conductive material.

4. A busway thermal expansion device as set forth in claim 1 wherein:
   (a) said first means connecting said one end of each of said flexible conductors to a corresponding one of said busbars comprises a plurality of L-shaped connector members corresponding in number to the number of said first group of elongated generally aparallel busbar conductors, each of said plurality of L-shaped connector members having a relatively short first leg and a relatively short second leg, means connecting said first leg of each of said plurality of L-shaped connector members to a corresponding one of said first group of elongated generally parallel busbar conductors, and means connecting said second leg of each of said plurality of L-shaped connecting members to said flexible conductor means; and
   (b) said second means connecting said other end of each of said flexible conductors comprises an angle member having a first leg and a second leg extending substantially at right angles to each other, means connecting said flexible conductor means to said first leg or said angle member, and means connecting each of said second group of elongated generally rectangular busbar conductors to said second leg of said angle member.

5. A thermal expansion device as set forth in claim 1 wherein:
   (a) said means slidably mounting said first group of elongated generally parallel busbar conductors comprises a second busbar housing having top and bottom walls and opposed side walls substantially enclosing said one end of said first group of elongated generally parallel busbar conductors extending outwardly of said generally rectangular housing, and roller means supported within said generally rectangular housing in engaging relation to said opposed side walls of said second busbar housing;
   (b) said means fixedly mounting said second group of elongated generally parallel busbar conductors comprises a third busbar housing having top and bottom walls and opposed side walls substantially enclosing said one end of said second group of elongated generally parallel busbar conductors extending outwardly of said generally rectangular housing, and clamping means fastening said third busbar housing to said other of said one pair of side walls of said generally rectangular housing;
   (c) said first means connecting said one of said flexible conductors comprises a plurality of L-shaped connector members corresponding in number to the number of said first group of elongated generally parallel busbar conductors, each of said plurality of L-shaped connector members having a relatively short first leg and a relatively short second leg, means connecting said first leg of each of said plurality of L-shaped connector member to a corresponding one of said first group of elongated generally parallel busbar conductors, and means connecting said second leg of each of said plurality of L-shaped connecting members to said flexible conductors; and
   (d) said second means connecting said other end of said flexible conductors comprises an angle member having a first leg and a second leg extending substantially at right angles to each other, means connecting said flexible conductors to said first leg of said angle member, and means connecting each of said second group of elongated generally rectangular busbar conductors to said second leg of said angle member.

6. A thermal expansion device as set forth in claim 5 wherein:
   (a) said flexible conductors comprise a plurality of flexible conductor links corresponding in number to the number of said first group of elongated generally parallel busbar conductors; and
   (b) each of said plurality of flexible conductor links is constructed of a plurality of thin strips of conductive materials.

References Cited

UNITED STATES PATENTS 2,727,939  12/1955  Wallace et al.
3,389,213   6/1968  Niemoller _____ 174—12 XR DARRELL L. CLAY, Primary Examiner U.S. Cl. X.R.
174—12, 99; 339—9